UNITED STATES PATENT OFFICE.

WILLIAM B. BOTTOMLEY, OF LONDON, ENGLAND.

TREATMENT OF PEAT FOR MAKING USEFUL PRODUCTS.

1,355,732.   Specification of Letters Patent.   Patented Oct. 12, 1920.

No Drawing.   Application filed May 19, 1919. Serial No. 298,276.

*To all whom it may concern:*

Be it known that I, WILLIAM BEECROFT BOTTOMLEY, a subject of the King of Great Britain, residing in London, England, have invented a certain new and useful Improved Treatment of Peat for Making Useful Products, of which the following is a specification.

In my British specification No. 105466 I have shown that the treatment of a peat with an alkaline liquid yields a solution of a nucleate. I have now found that a solution made by heating peat with saline solutions generally also contains nucleic acid or a nucleate or a derivative of this acid, or some body which yields nucleic acid when the solution is treated in the manner usual for isolating this acid.

Whatever the nature of the body present in the saline solution it appears to favor the production of the products which I have called auximones in my British specification No. 16658 of 1915, when the peat containing the saline solution is subjected to the action of certain organisms.

It may be that peat which has been mixed with saline solutions of one kind or another, prior to its application as a manure, has been improved for this purpose apart from the manurial value of the added salt. The action of a saline solution at the ordinary temperature has, however, but slight effect in the direction indicated above.

My present invention consists in heating peat with a solution of a salt which is not alkaline for the purpose of obtaining a solution of nucleic acid or a nucleate or derivative or a body yielding nucleic acid or a nucleate. In accordance with the use to which the solution is to be put it may be left in the peat or separated therefrom.

Since an aqueous solution of sodium chlorid is apparently at least as useful as any other saline solution for the purpose of the invention, it is preferable for obvious reasons; but an aqueous solution of any other salt, such as an alkali chlorid or sulfate, an alkaline earth chlorid or an ammonium salt may be used.

The mass of peat which has been moistened or saturated with the saline solution is heated. Advantageously the temperature of the mass may be raised above 100° C. by heating in an autoclave.

When nucleic acid or a nucleate or derivative is the objective the saline solution expressed or otherwise separated from the peat is worked up in the known manner.

When the heated peat is for manurial use, it may advantageously be inoculated with nitrogen-fixing organisms or with microorganisms, capable of producing ammonia or other suitable organisms, for instance yeast. And there is advantage in mixing the peat before or after treatment with an insoluble phosphate or a basic slag before the inoculation, as described in my British specification No. 20789 of 1914, such mixing being preferably followed by heating it in an autoclave or otherwise preparatory to the inoculation.

I have found that the auximones are of value in animal nutrition so that the treated peat may form a basis for animal food, preferably after sterilization.

The following examples illustrate the invention:—

1. A layer of peat, say 6 inches deep, is alternately sprinkled with a solution of common salt and turned over, until a quantity of salt amounting to from 2 to 10 per cent. of the weight of the anhydrous peat, depending on the purpose for which it is required as stated below, dissolved in about 5 to 10 times its weight of water, has been used. The peat is then charged into a tank containing perforated pipes through which steam at about 60 lbs. pressure is blown until the temperature of the whole mass is slightly above 100° C., which is generally the case in about half an hour for a ton of peat, the tank being loosely covered.

The peat treated with the smaller proportion of salt is now ready for use as a manure, while that treated with the larger proportion is ready for pressing to expel the liquid which is to be worked up in known manner for production of nucleic acid.

To enhance its manurial value or its value as constituent of food for animals, the saline peat may be spread in a layer about a foot deep on a suitably heated floor and sprinkled with water containing ammonia-producing and nitrogen-fixing bacteria, or other suitable organisms; it is then kept for about three days, at about 26°–28° C. For feeding purposes it should now be sterilized by again heating it in the aforesaid tank to about 120° C.

2. Four parts of the peat, before or after treatment with salt and heating, as described in the first example, are mixed with one part of finely ground mineral phosphate. The mixture is then spread on the heated floor and inoculated with organisms as described in Example 1. The product is a phosphatic manure.

Having thus described the nature of the said invention and the best means I know of carrying the same into practical effect, I claim:—

1. A process for producing auximones in peat, which consists of first developing a nucleic acid derivative in the peat by moistening the peat with a solution of a salt which is not alkaline, and heating this moistened peat under conditions for retaining water therein, and then placing the peat under conditions suitable for growth of micro-organisms.

2. A process for producing auximones in peat, which consists of first developing a nucleic acid derivative in the peat by moistening the peat with a solution of an alkali metal salt which is not alkaline, and heating this moistened peat under conditions for retaining water therein, and then placing the peat under conditions suitable for growth of micro-organisms.

3. A process for producing auximones in peat, which consists of first developing a nucleic acid derivative in the peat by moistening the peat with a solution of sodium chlorid which is not alkaline, and heating this moistened peat under conditions for retaining water therein, and then placing the peat under conditions suitable for growth of micro-organisms.

4. A process for producing auximones in peat, which consists of first developing a nucleic acid derivative in peat by moistening the peat with a solution of a salt which is not alkaline, and heating this moistened peat under conditions for retaining water therein, and then inoculating the moist peat with micro-organisms and maintaining it at the temperature known to be suitable for growth of the micro-organisms.

5. A process for producing auximones in peat, which consists of first developing a nucleic acid derivative in peat by moistening the peat with a solution of an alkali metal salt which is not alkaline, and heating this moistened peat under conditions for retaining water therein, and then inoculating the moist peat with micro-organisms.

6. A process for producing auximones in peat, which consists of first developing a nucleic acid derivative in peat by moistening the peat with a solution of a sodium chlorid which is not alkaline, and heating this moistened peat under conditions for retaining water therein, and then inoculating the moist peat with micro-organisms.

7. A process for treating peat for the purpose herein set forth, which consists in moistening the peat with a solution of a salt which is not alkaline and then heating the moist peat to a temperature above 100° C. while it retains water.

8. A process for treating peat for the purpose herein set forth, which consists in moistening the peat with a solution of an alkali metal salt which is not alkaline and then heating the moist peat to a temperature above 100° C. while it retains water.

9. A process for treating peat for the purpose herein set forth, which consists in moistening the peat with a solution of sodium chlorid, which is not alkaline, and then heating the moist peat to a temperature above 100° C. while it retains water.

10. A treatment of peat which consists in producing auximones and soluble phosphate therein, by first developing a nucleic acid derivative in the peat by moistening the peat with a solution of a salt which is not alkaline and heating the moistened peat under conditions for retaining water therein, then mixing the moist peat with an insoluble phosphate and then growing micro-organisms in the mixture.

11. A treatment of peat which consists in producing auximones and soluble phosphate therein, by first developing a nucleic acid derivative in the peat by moistening the peat with a solution of an alkali metal salt which is not alkaline and heating the moistened peat under conditions for retaining water therein, then mixing the moist peat with an insoluble phosphate and then growing micro-organisms in the mixture.

12. A treatment of peat which consists in producing auximones and soluble phosphate therein, by first developing a nucleic acid derivative in the peat by moistening the peat with a solution of sodium chlorid which is not alkaline and heating the moistened peat under conditions for retaining water therein, then mixing the moist peat with an insoluble phosphate and then growing micro-organisms in the mixture.

13. A treatment of peat which consists in mixing the peat with 2 to 10 per cent. of its dry weight of common salt dissolved in 5 to 10 times its weight of water, heating the mixture with steam at a temperature above 100° C. in a loosely covered vessel, and then spreading the peat on a heated surface and sprinkling it with water containing micro-organisms.

14. A treatment of peat which consists in mixing the peat with 2 to 10 per cent. of its dry weight of common salt dissolved in 5 to 10 times its weight of water, heating the mixture with steam at a temperature above 100° C. in a loosely covered vessel, and then mixing the peat with an insoluble phosphate and then spreading the mixture on a heated surface and sprinkling it with water containing micro-organisms.

In testimony whereof I have signed my name to this specification.

WILLIAM B. BOTTOMLEY.